(12) United States Patent
Shen et al.

(10) Patent No.: US 12,505,725 B2
(45) Date of Patent: Dec. 23, 2025

(54) OPTICAL COMPONENT DRIVING MECHANISM

(71) Applicant: TDK TAIWAN CORP., Taoyuan (TW)

(72) Inventors: Wei-Jhe Shen, Taoyuan (TW); Yi-Ho Chen, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 647 days.

(21) Appl. No.: 17/883,891

(22) Filed: Aug. 9, 2022

(65) Prior Publication Data

US 2023/0038382 A1 Feb. 9, 2023

Related U.S. Application Data

(60) Provisional application No. 63/230,990, filed on Aug. 9, 2021.

(51) Int. Cl.
*G03B 13/36* (2021.01)
*G02B 7/08* (2021.01)
(Continued)

(52) U.S. Cl.
CPC ............. *G08B 6/00* (2013.01); *G02B 7/08* (2013.01); *G03B 5/00* (2013.01); *G03B 9/40* (2013.01);
(Continued)

(58) Field of Classification Search
CPC . G03B 5/00; G03B 5/04; G03B 13/36; G03B 2205/0007; G03B 2205/0053; G03B 2205/0015; G03B 2205/0069; G03B 3/02; G03B 3/10; G03B 13/34; G03B 30/00; G02B 7/021; G02B 7/04; G02B 7/08; G02B 7/09; G02B 7/10; G02B 9/62; G02B 13/001; G02B 13/0065; G02B 27/646; H04N 5/2253; H04N 5/2254;
(Continued)

(56) References Cited

U.S. PATENT DOCUMENTS

2013/0016428 A1* 1/2013 Sugawara ............... G02B 7/08
359/557
2017/0108705 A1* 4/2017 Yu ............................ G02B 7/09
(Continued)

*Primary Examiner* — Marin Pichler
(74) *Attorney, Agent, or Firm* — MUNCY, GEISSLER, OLDS & LOWE, P.C.

(57) ABSTRACT

An optical component driving mechanism is provided. The optical component driving mechanism includes a movable portion, a fixed portion, a driving assembly, and a first circuit member. The movable portion is connected to an optical component. The movable portion includes a side portion. The optical component has an optical axis. The movable portion is movable relative to the fixed portion. The driving assembly includes a coil and a magnetically permeable component. The driving assembly is configured to drive the movable portion to move relative to the fixed portion. The first circuit member is configured to transmit electrical signals. The first circuit member includes a first portion. The first portion is disposed between the coil and the magnetically permeable component. The coil, the magnetically permeable component, and the first portion of the first circuit member are disposed on the side portion of the movable portion.

18 Claims, 14 Drawing Sheets

(51) Int. Cl.
| | |
|---|---|
| *G03B 5/00* | (2021.01) |
| *G03B 9/40* | (2021.01) |
| *G08B 6/00* | (2006.01) |
| *H02K 11/21* | (2016.01) |
| *H02K 41/035* | (2006.01) |
| *H04N 23/51* | (2023.01) |
| *H04N 23/54* | (2023.01) |
| *H04N 23/55* | (2023.01) |
| *H04N 23/57* | (2023.01) |
| *H05K 1/18* | (2006.01) |

(52) U.S. Cl.
CPC ............ *G03B 13/36* (2013.01); *H02K 11/21* (2016.01); *H02K 41/0354* (2013.01); *H04N 23/51* (2023.01); *H04N 23/54* (2023.01); *H04N 23/55* (2023.01); *H04N 23/57* (2023.01); *H05K 1/181* (2013.01); *H05K 2201/10916* (2013.01)

(58) Field of Classification Search
CPC .. H04N 5/2257; H04N 5/23287; H02K 11/33; H02K 41/0356
USPC ....... 359/911, 554, 555, 557, 811, 813, 814, 359/824, 872, 877
See application file for complete search history.

(56) References Cited

U.S. PATENT DOCUMENTS

2021/0048729 A1\* 2/2021 Yoon ................. G03B 30/00
2021/0396950 A1\* 12/2021 Park ................. H04N 23/57

\* cited by examiner

OPTICAL COMPONENT DRIVING MECHANISM

CROSS REFERENCE TO RELATED APPLICATIONS

This application claims the benefit of U.S. Provisional Application No. 63/230,990 filed 9 Aug. 2021, the entirety of which is incorporated by reference herein.

BACKGROUND OF THE INVENTION

Field of the Invention

The present disclosure relates to an optical component driving mechanism, and more particularly to an optical component driving mechanism with a magnetically permeable component.

Description of the Related Art

Technology has developed to the point that many electronic devices such as tablet computers and smart phones are equipped with lens modules nowadays, so that they have the functionality of taking pictures and videos. If an electronic device equipped with a lens module happens to shake while the user is using the camera function, the image captured by the lens module may come out blurry. However, requirements for image quality are increasing daily, making it ever more important for the lens module to have an excellent optical image stabilization function.

BRIEF SUMMARY OF THE INVENTION

An optical component driving mechanism is provided. The optical component driving mechanism includes a movable portion, a fixed portion, a driving assembly, and a first circuit member. The movable portion is connected to an optical component. The movable portion includes a side portion. The optical component has an optical axis. The movable portion is movable relative to the fixed portion. The driving assembly includes a coil and a magnetically permeable component. The driving assembly is configured to drive the movable portion to move relative to the fixed portion. The first circuit member is configured to transmit electrical signals. The first circuit member includes a first portion. The first portion is disposed between the coil and the magnetically permeable component. The coil, the magnetically permeable component, and the first portion of the first circuit member are disposed on the side portion of the movable portion.

According to some embodiments of the present disclosure, the magnetically permeable component includes an upper edge, a lower edge, a left edge, a right edge, and an opening. The upper edge, the lower edge, the left edge, and the right edge surround the opening.

According to some embodiments of the present disclosure, the magnetically permeable component includes an upper edge, a lower edge, and an extending portion. The extending portion is parallel to the upper edge and the lower edge. The extending portion is positioned between the upper edge and the lower edge.

According to some embodiments of the present disclosure, the extending portion of the magnetically permeable component is located a distance away from the upper edge. The extending portion of the magnetically permeable component is located the same distance away from the lower edge.

According to some embodiments of the present disclosure, the magnetically permeable component further includes a solid portion positioned between the upper edge and the lower edge. The solid portion connected with the upper edge and the lower edge. The extending portion extends from the solid portion.

According to some embodiments of the present disclosure, the optical component driving mechanism further includes a sensing component. The sensing component is disposed on the first portion of the first circuit member. The sensing component and the solid portion of the magnetically permeable component overlap in a direction that is perpendicular to the optical axis.

According to some embodiments of the present disclosure, the movable portion includes a first positioning structure. The first positioning structure extends from the side portion of the movable portion in a direction that is perpendicular to the optical axis. The first positioning structure is positioned between the upper edge and the extending portion of the magnetically permeable component, to position the magnetically permeable component on the movable portion.

According to some embodiments of the present disclosure, the movable portion further includes another first positioning structure. The another first positioning structure extending from the side portion of the movable portion along the direction that is perpendicular to the optical axis. The another first positioning structure is positioned between the lower edge and the extending portion of the magnetically permeable component, to position the magnetically permeable component on the movable portion.

According to some embodiments of the present disclosure, in the direction that is perpendicular to the optical axis, the height of the first positioning structure is lower than the height of the magnetically permeable component.

According to some embodiments of the present disclosure, the movable portion further includes a second positioning structure. The second positioning structure extends from the side portion of the movable portion in a direction that is perpendicular to the optical axis.

According to some embodiments of the present disclosure, the first portion of the first circuit member includes an opening. The second positioning structure passes through the opening to position the first portion of the first circuit member on the movable portion.

According to some embodiments of the present disclosure, the coil is affixed to the side portion of the movable portion via the second positioning structure.

According to some embodiments of the present disclosure, in the direction that is perpendicular to the optical axis, the height of the second positioning structure is higher than the height of the coil.

According to some embodiments of the present disclosure, the coil includes a first connecting portion. The first circuit member includes a second connecting portion. The first connecting portion is electrically connected to the second connecting portion via soldering.

According to some embodiments of the present disclosure, the second connecting portion includes a plurality of first electrical connecting points and a plurality of second electrical connecting points. The first electrical connecting points and the second electrical connecting points are disposed in a direction that is perpendicular to the optical axis. Each of the first electrical connecting point is located between the second electrical connecting points when viewed along the optical axis. The height of the plurality of first electrical connecting points on the optical axis is greater than the height of the plurality of second electrical connecting points on the optical axis.

According to some embodiments of the present disclosure, the optical component driving mechanism further includes an adhesive component. The adhesive component is disposed on the first connecting portion and the second connecting portion after the first connecting portion is soldered to the second connecting portion.

According to some embodiments of the present disclosure, the coil includes an inner side and an outer side. The adhesive component contacts the outer side of the coil.

According to some embodiments of the present disclosure, the optical component driving mechanism further includes another adhesive component disposed on the inner side of the coil.

According to some embodiments of the present disclosure, the first circuit member further includes a second portion and a third portion. The second portion is disposed on the fixed portion. The first portion is connected to the second portion through the third portion.

According to some embodiments of the present disclosure, the optical component driving mechanism further includes a second circuit member. The second circuit member is disposed on the fixed portion and electrically connected to the second portion of the first circuit member.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF THE INVENTION

In order to make the purpose, features, and advantages of the present disclosure more obvious and understandable, the following embodiments are specially cited, and the accompanying drawings are used for detailed description. Among them, the configuration of each component in the embodiment is for illustration purposes, and is not intended to limit the disclosure. In addition, part of the repetition of the reference numbers in the embodiments is for simplifying the description, and does not mean the relevance between different embodiments. The directional terms mentioned in the following embodiments, for example: up, down, left, right, front or back, etc., are only directions for referring to the attached drawings. Therefore, the directional terms used are used to illustrate and not to limit the disclosure.

In addition, relative terms such as "lower" or "bottom" and "higher" or "top" may be used in the embodiments to describe the relative relationship between one component of the illustration and another component. It can be understood that if the illustrated device is turned upside down, the components described on the "lower" side will become the components on the "higher" side.

The optical component driving mechanism of the embodiment of the present invention is described below. However, it can be easily understood that the embodiments of the present invention provide many suitable inventive concepts and can be implemented in a wide variety of specific backgrounds. The specific embodiments disclosed are only used to illustrate the use of the present invention in a specific method, and are not used to limit the scope of the present invention. Unless otherwise defined, all terms used here (including technical and scientific terms) have the same meanings commonly understood by the general artisans to whom the disclosures in this article belong. It is understandable that these terms, such as the terms defined in commonly used dictionaries should be interpreted as having a meaning consistent with the relevant technology and the background or context of this disclosure, and should not be interpreted in an idealized or excessively formal way, unless specifically defined herein.

Figure 1:
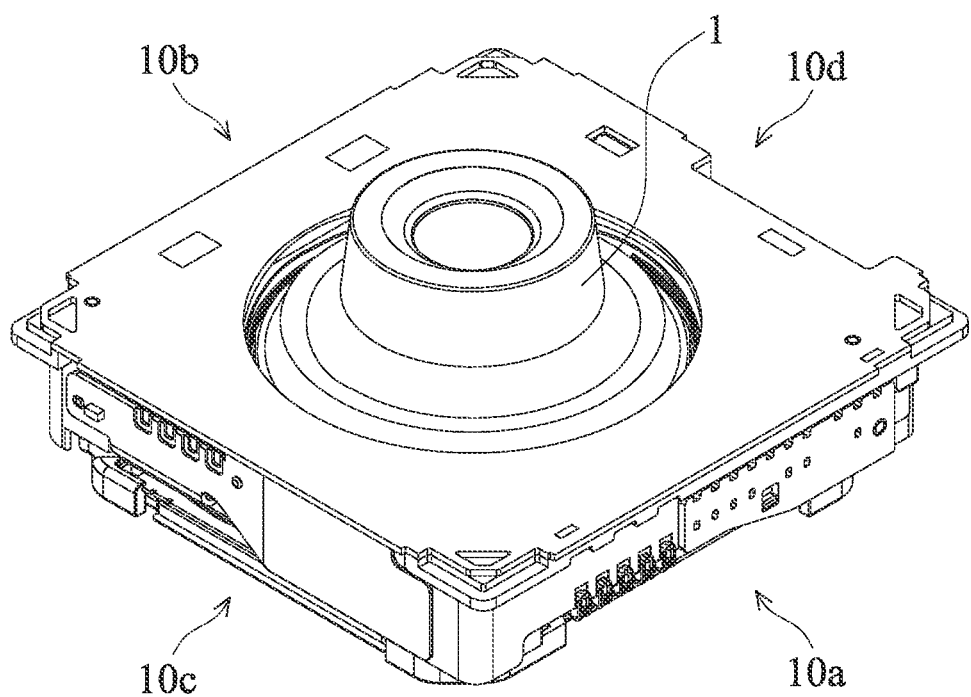
FIG. 1 shows a perspective view of an optical component driving mechanism, according to some embodiments of the present disclosure.
Figure 1:
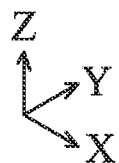

FIG. 1 shows a perspective view of an optical component driving mechanism 10, according to some embodiments of the present disclosure. The aforementioned optical component driving mechanism 10 may be disposed inside an electronic device such as a camera, a tablet computer, or a mobile phone, to obtain images. The aforementioned optical component driving mechanism 10 may relatively move both the first optical component 1 and the second optical component 2 (FIG. 2) disposed therein, so as to achieve the purpose of auto-focusing (AF) and optical image stabilization (OIS). The detailed structure of the optical component driving mechanism 10 is described below.

As shown in FIG. 1, the optical component driving mechanism 10 has a substantially rectangular shape, and the optical component driving mechanism 10 includes a first side 10a, a second side 10b, a third side 10c, and a fourth side 10d.

According to some embodiments of the present disclosure, the first side 10a is opposite to the second side 10b, and the first side 10a and the second side 10b are parallel to each other. According to some embodiments of the present disclosure, the third side 10c is opposite to the fourth side 10d, and the third side 10c and the fourth side 10d are parallel to each other.

Figure 2:
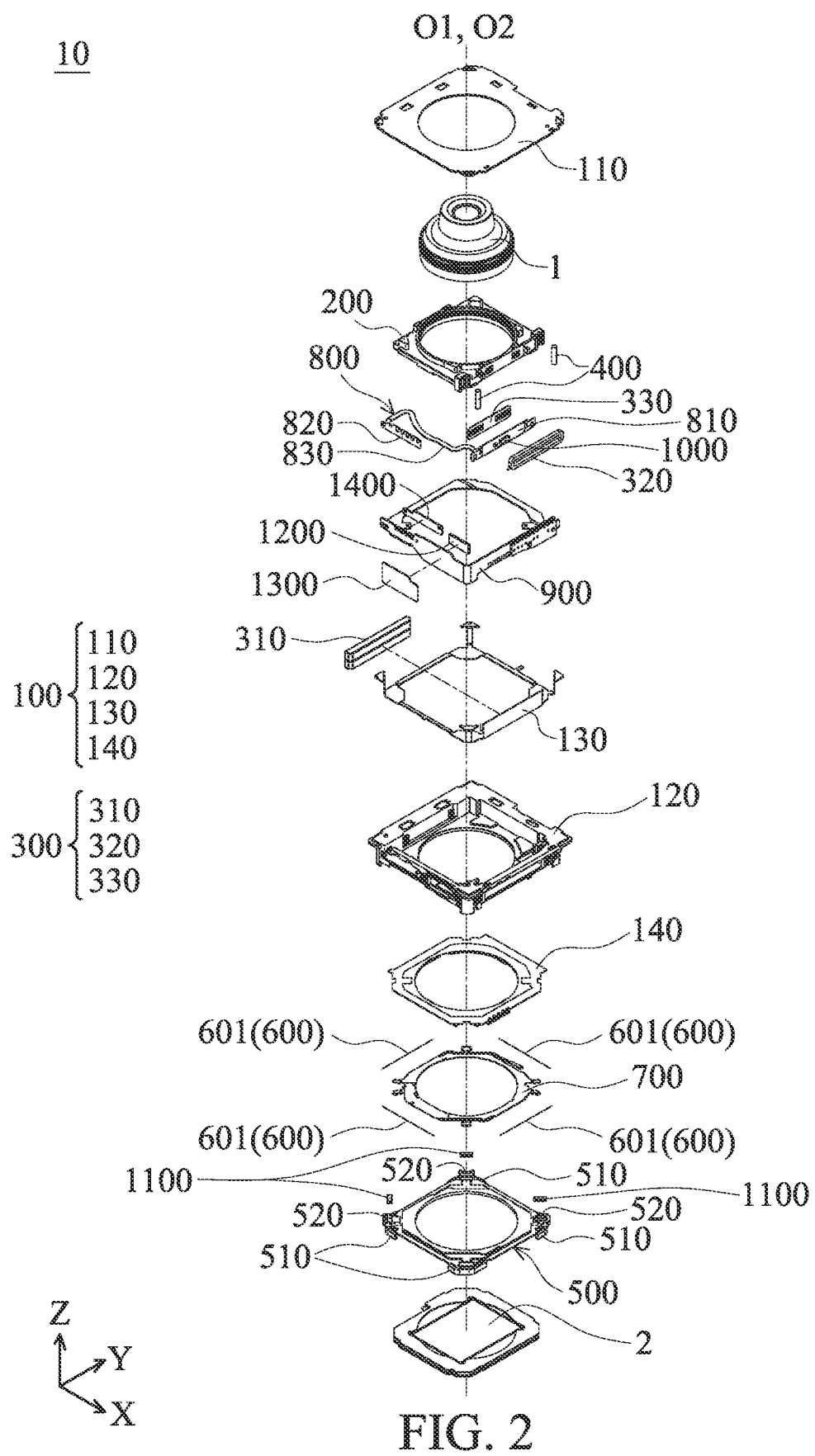
FIG. 2 is an exploded view of the optical component driving mechanism, according to some embodiments of the present disclosure.
Figure 10A:
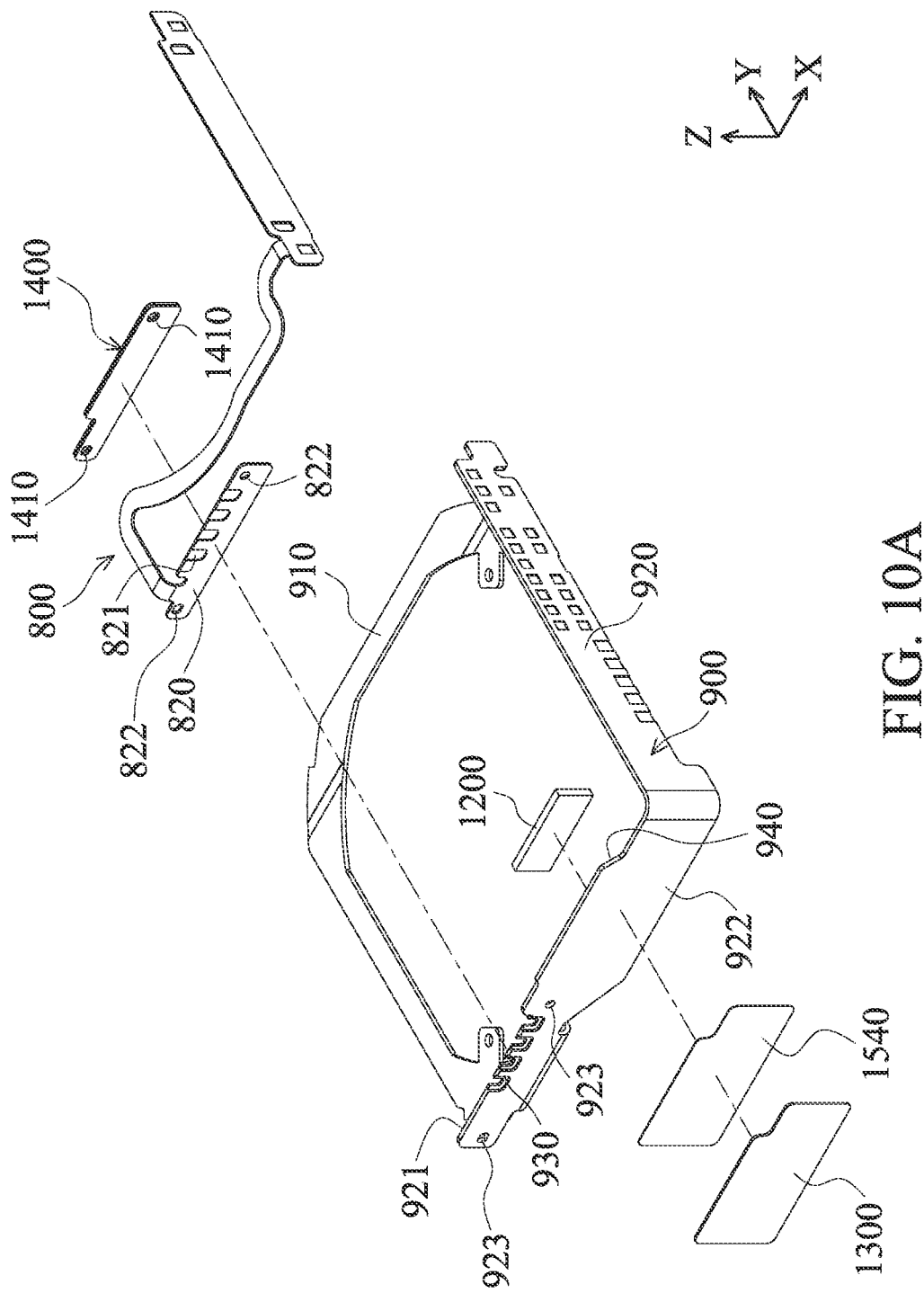
FIG. 10A shows an exploded view of the first circuit member, a second circuit member, a control integrated circuit, a first reinforcing component, a second reinforcing component, and the adhesive component, according to some embodiments of the present disclosure.

FIG. 2 is an exploded view of the optical component driving mechanism 10, according to some embodiments of the present disclosure. As shown in FIG. 2, the optical component driving mechanism 10 includes a fixed portion 100, a movable portion 200, a driving assembly 300, a set of supporting components 400, another movable portion 500, another driving assembly 600, a connecting plate 700, a first circuit member 800, a second circuit member 900, a sensing component 1000, three sensing components 1100, a control integrated circuit 1200, a first reinforcing component 1300, a second reinforcing component 1400, and multiple adhesive components 1510 (FIG. 4A), 1520 (FIG. 4D), 1530 (FIG. 4E), 1540 (FIG. 10A).

Please refer to FIG. 1 to FIG. 2 together. According to some embodiments of the present disclosure, the fixed portion 100 includes a top cover 110, a base 120, a bracket member 130, and a base plate 140. The top cover 110 is connected to the base 120 to form an interior space and accommodate other components of the optical component driving mechanism 10. The bracket member 130 is embedded in the base 120. This configuration may strengthen the mechanical strength of the fixed portion 100. The bracket member 130 may be made of magnetically permeable material. The configuration of the substrate 140 is described in detail later.

According to some embodiments of the present disclosure, the movable portion 200 is connected to the first optical component 1. Specifically, the movable portion 200 fixedly holds the first optical component 1. Therefore, the first optical component 1 will move with the movable portion 200 when the movable portion 200 moves. The first optical component 1 has an optical axis O1, and the optical axis O1 is substantially parallel to the Z-axis.

The driving assembly 300 may drive the movable portion 200 to move relative to the fixed portion 100 in the optical axis O1, so as to perform the auto-focusing function of the optical component driving mechanism 10. According to some embodiments of the present disclosure, the driving assembly 300 includes a magnetic component 310, a coil 320, and a magnetically permeable component 330.

According to some embodiments of the present disclosure, the magnetic component 310 is disposed on the base 120 and the bracket member 130. The magnetic component 310 corresponds to the coil 320. The coil 320 is disposed on the side of the movable portion 200 facing the magnetic component 310. The magnetically permeable component 330 is disposed between the movable portion 200 and the coil 320. The magnetically permeable component 330 may concentrate the magnetic force of the magnetic component 310 in a predetermined direction, so as to enhance the magnetic thrust of the driving assembly 300 to drive the movable portion 200 to move, and reduce the effect of magnetic interference.

When a driving signal is applied to the driving assembly 300 (for example, a current is applied by an external power source), a magnetic force is generated between the magnetic component 310 and the coil 320, which may drive the movable portion 200 to move relative to the fixed portion 100 to achieve the function of auto-focusing.

According to some embodiments of the present disclosure, the supporting components 400 are two guide rods extending parallel to the optical axis O1 (Z-axis). The movable portion 200 is movable relative to the fixed portion 100 by sliding along the supporting components 400. Compared with the configuration in the prior art that uses a spring sheet to movably connect the lens holder, the supporting component 400 used in the present invention allows the movable portion 200 to hold the optical component 1 with larger mass and size. Thereby, the performance of the optical component driving mechanism 10 is improved.

According to some embodiments of the present disclosure, the movable portion 500 fixedly holds the second optical component 2. Therefore, the second optical component 2 will move with the movable portion 500 when the movable portion 500 moves. The second optical component 2 has an optical axis O2. For the illustration purposes, the optical axis O2 in FIG. 2 is substantially parallel to the Z-axis.

When viewed along the Z-axis, the movable portion 500 has a substantially square shape with four corners. The movable portion 500 includes four stopper portions 510 and three grooves 520. When the movable portion 500 is driven, the stopper portion 510 may limit the movement range of the movable portion 500 relative to the fixed portion 100.

The four stopper portions 510 are respectively located at four corners of the movable portion 500. The three grooves 520 are respectively located at the corner intersecting the first side 10a and the fourth side 10d, at the corner intersecting the second side 10b and the third side 10c, and at and the corner intersecting the second side 10b and the fourth side 10d.

According to some embodiments of the present disclosure, the driving assembly 600 may drive the movable portion 500 to move relative to the fixed portion 100. Specifically, the driving assembly 600 includes a plurality of biasing components 601. The biasing component 601 may have a shape memory alloy (Shape Memory Alloys, SMA) material, such as titanium-nickel alloy (TiNi), titanium-palladium alloy (TiPd), titanium-nickel-copper alloy (TiNiCu), titanium-nickel-palladium alloy (TiNiPd), etc.

Moreover, the length of the biasing components 601 may be changed by applying a driving signal, such as, current, to the biasing components 601 through a power supply. In addition, different driving signals may be applied to the biasing components 601 to separately control the length variation of each biasing component 601.

According to some embodiments of the present disclosure, the connecting plate 700 may be a spring plate. The connecting plate 700 is disposed between the base plate 140 and the movable portion 500. When a driving signal is applied to the biasing components 601, each biasing component 601 may have the same or different length changes. Then, the movable portion 500 may be driven to move relative to the base plate 140 of the fixed portion 100 via the connecting plate 700, and therefore the second optical component 2 may be driven to move, including translation, rotation, etc., to achieve auto-focusing, optical image stabilization, tilt correction and so on.

According to some embodiments of the present disclosure, the first circuit member 800 may be a flexible printed circuit board. The first circuit member 800 is electrically connected to the driving assembly 300 and the second circuit member 900. The first circuit member 800 includes a first portion 810, a second portion 820, and a third portion 830.

The first portion 810 is disposed on the movable portion 200 and located between the coil 320 and the magnetically permeable component 330. The second portion 820 is disposed on the base 120, the details of which are described in detail with respect to FIG. 11.

Two ends of the third portion 830 are respectively connected to the first portion 810 positioned on the movable portion 200 and the second portion 820 positioned on the base 120. Therefore, when the movable portion 200 moves in the optical axis O1 through the driving assembly 300, the flexible third portion 830 is movably connected to the movable portion 200 and the base 120 via the first portion 810 and the second portion 820.

According to some embodiments of the present disclosure, the second circuit member 900 may be a flexible printed circuit (FPC). The second circuit member 900 is fixedly disposed on the base 120. The second circuit member 900 is configured to transmit electrical signals. The second circuit member 900 is electrically connected to the driving assembly 300 and the driving assembly 600.

According to some embodiments of the present disclosure, the sensing component 1000 is configured to sense the position of the movable portion 200 relative to the fixed portion 100. The sensing component 1000 is disposed on the first portion 810 of the first circuit member 800.

It should be understood that the magnetic component 310 disposed on the first side 10a served as the magnetic component 310 of the driving assembly 300 and the reference component for the sensing component 1000 at the same time. In this way, the magnetic component 310 may perform both driving and sensing functions, and the volume of the optical component driving mechanism 10 may be reduced to achieve miniaturization.

According to some embodiments of the present disclosure, the sensing components 1100 are sensing magnetic components, and the sensing components 1100 correspond to the control integrated circuit 1200. The sensing components 1100 are disposed in the grooves 520 of the movable portion 500.

According to some embodiments of the present disclosure, the control integrated circuit 1200 is disposed on the second circuit member 900. The control integrated circuit 1200 is an all-in-one integrated circuit in which the sensing integrated circuit and the control integrated circuit are packaged in the same package. That is, the control integrated circuit 1200 has both a driving function and a sensing function.

According to some embodiments of the present disclosure, the control integrated circuit 1200 controls the output of the first driving signal to drive the driving assembly 300. The sensing component 1000 receives the first driving signal, and then outputs the first driving power to the driving assembly 300.

According to some embodiments of the present disclosure, the control integrated circuit 1200 may determine the position of the sensing components 1100 by detecting the change of the magnetic field of the sensing components 1100, thereby increasing the accuracy of compensation or focusing.

That is, the control integrated circuit 1200 outputs a second driving signal to drive the driving assembly 600. More specifically, the sensing components 1100 output a second sensing signal (magnetic field change) to the control integrated circuit 1200, and the control integrated circuit 1200 outputs the second driving signal according to the second sensing signal.

According to some embodiments of the present disclosure, the first reinforcing component 1300 is disposed on the opposite side of the second circuit member 900 relative to the control integrated circuit 1200. The first reinforcing component 1300 is configured to strengthen the mechanical strength of the second circuit member 900, and the first reinforcing component 1300 reduces the external magnetic field interference on the control integrated circuit 1200. The first reinforcing component 1300 may be made of metal material or magnetically permeable material.

Figure 11:
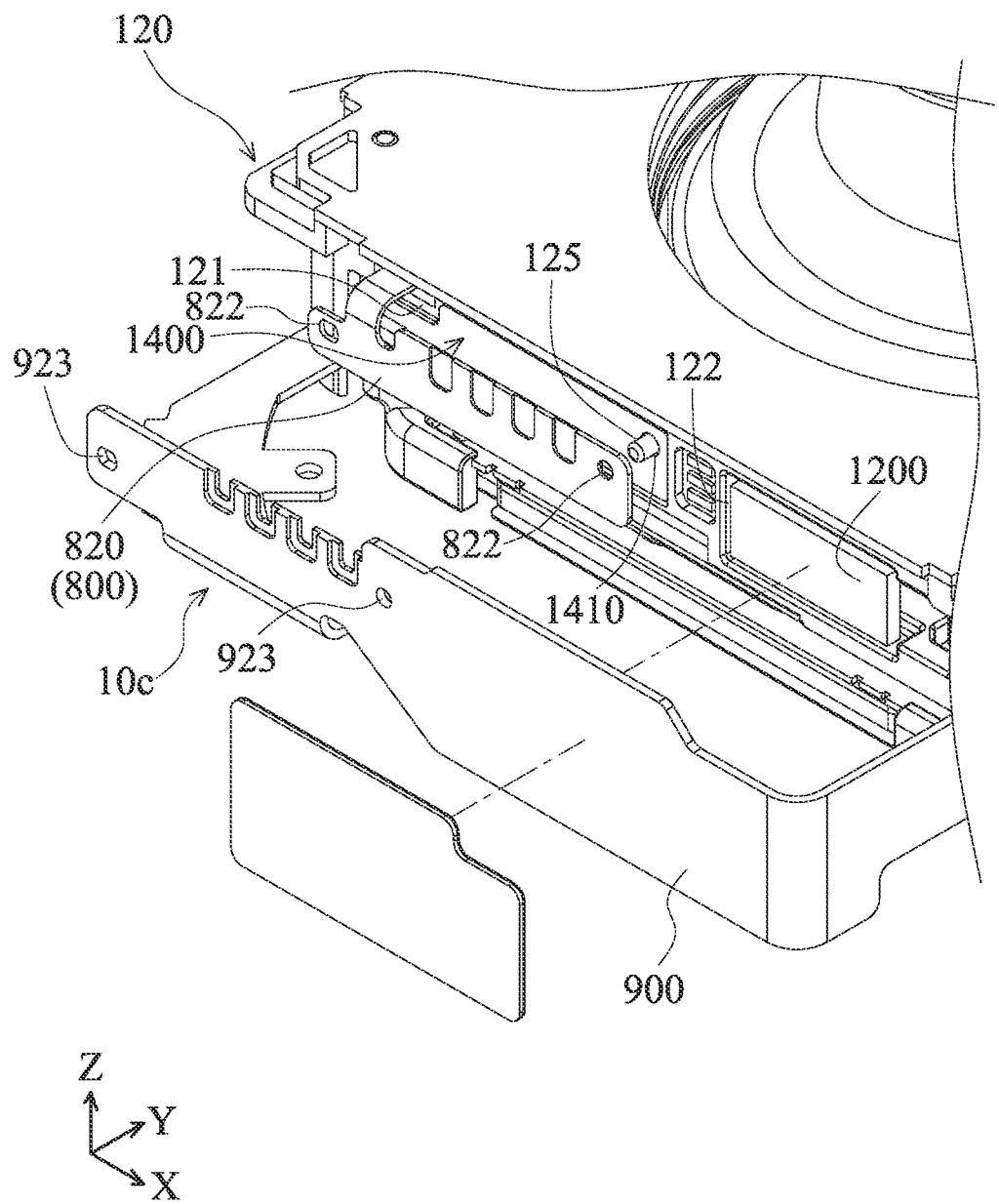
FIG. 11 shows an exploded view of the third side of the optical component driving mechanism, according to some embodiments of the present disclosure.

According to some embodiments of the present disclosure, the second reinforcing component 1400 is disposed on the base 120, the details of which are more clearly shown with respect to FIG. 11. The second reinforcing component 1400 is configured to strengthen the mechanical strength of the second portion 820 of the first circuit member 800. Therefore, the first circuit member 800 that is simultaneously connected to the base 120 and the movable portion 200 would not easily deform when the movable portion 200 is driven. The second reinforcing component 1400 may be made of metal material or magnetically permeable material.

Figure 3:
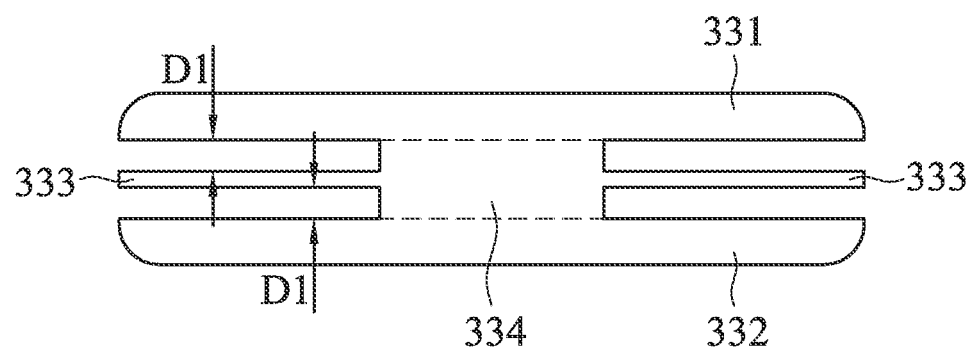
FIG. 3 shows a front view of a magnetically permeable component, according to some embodiments of the present disclosure.

FIG. 3 shows a front view of the magnetically permeable component 330, according to some embodiments of the present disclosure. As shown in FIG. 3, the magnetically permeable component 330 includes an upper edge 331, a lower edge 332, two extending portions 333, and a solid portion 334. For illustration purposes, the upper edge 331, the lower edge 332, and the solid portion 334 are separated by dash lines in FIG. 3.

The upper edge 331 and the lower edge 332 are parallel to the extending portion 333. The extending portions 333 and the solid portion 334 are located between the upper edge 331 and the lower edge 332. The extending portions 333 extend from the solid portion 334. The extending portions 333 are respectively spaced apart from the upper edge 331 and the lower edge 332 by a distance D1. The upper side of the solid portion 334 connects with the upper edge 331. The lower side of the solid portion 334 connects with the lower edge 332.

It should be understood that there is a magnetic attraction between the magnetic component 310 (FIG. 2) and the magnetically permeable component 330. The component force of the magnetic attraction force in the X-axis may be regarded as an attachment force, and the component force in the Z-axis may be regarded as a restoring force. The attachment force makes the movable portion 200 (FIG. 2) abut against the supporting components 400 (FIG. 2), so that the movable portion 200 is movable in the Z-axis with the driving of the driving assembly 300 (FIG. 2), so as to achieve auto-focusing effect.

It should be understood that, since the magnetic attractive force has no longitudinal (Z-axis) component when the movable portion 200 is located at an initial position (where the magnetic component 310 and the magnetically permeable component 330 are substantially located at the same position in the Z-axis), the restoring force at the time is approximately zero. In the prior art, as the movable portion 200 moves from the initial position to a limit position, the restoring force will gradually increase. The gradually increasing restoring force will affect the driving performance of the movable portion 200.

In the embodiment of the present invention, there is a gap between the extending portion 333 and the upper edge 331 of the magnetically permeable component 330, and there is a gap between the extending portion 333 and the lower edge 332 of the magnetically permeable component 330. With this configuration, when the movable portion 200 is displaced to a limit position, the restoring force generated between the magnetic component 310 and the magnetically permeable component 330 may be maintained within a certain value (for example, 6 mN~10 mN). Thus, the driving assembly in the present invention has better performance (such as, better driving accuracy).

Figure 4A:
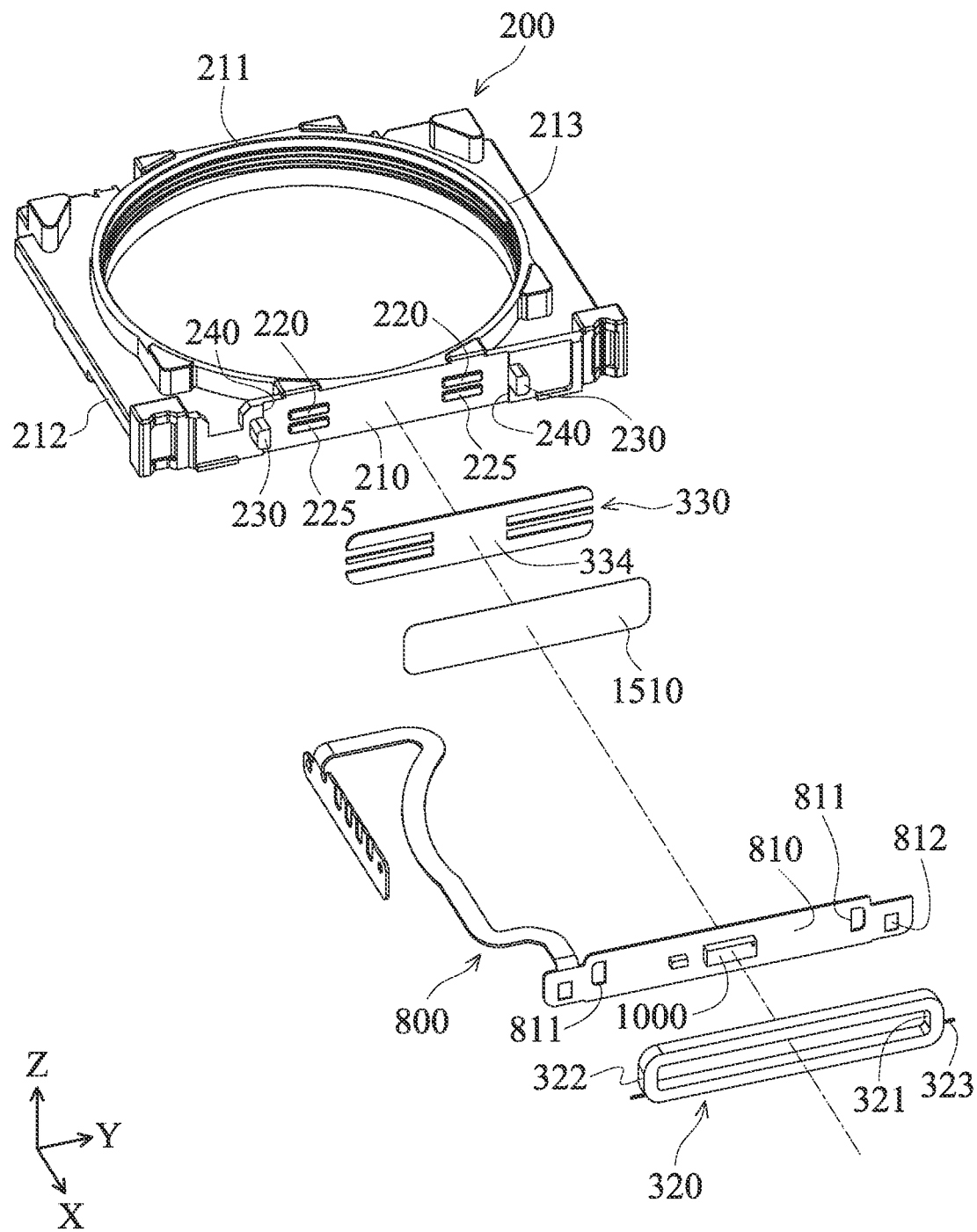
FIG. 4A shows an exploded view of a movable portion, a coil, the magnetically permeable component, a first circuit member, a sensing component, and an adhesive component, according to some embodiments of the present disclosure.
Figure 4B:
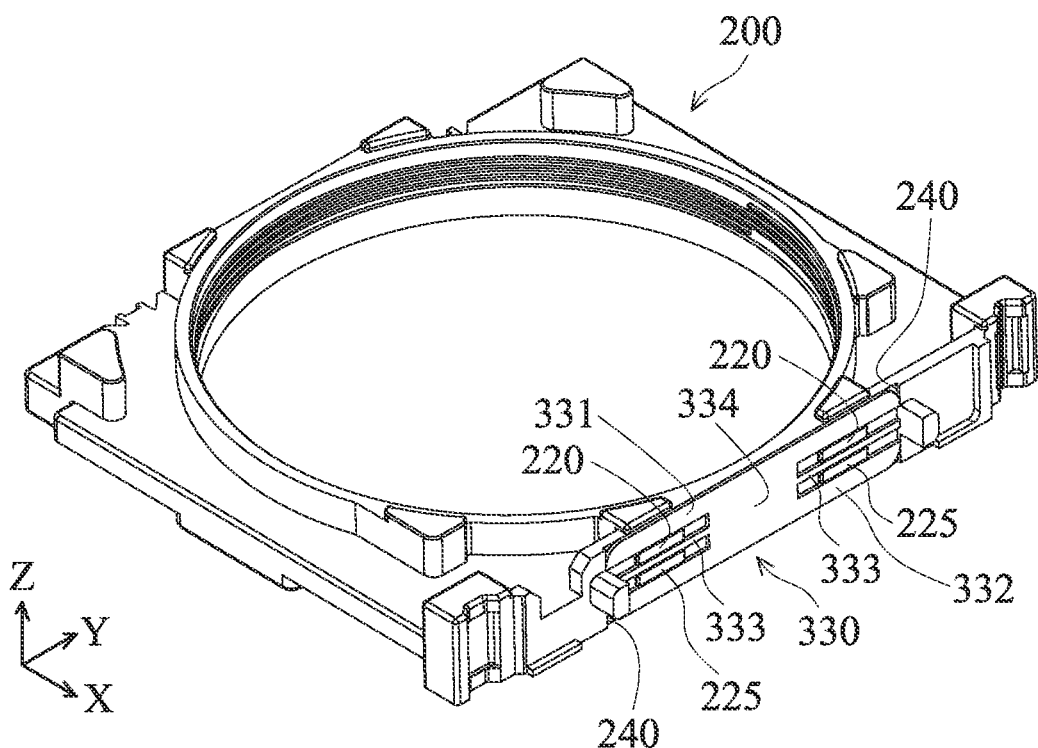
FIG. 4B shows a perspective view of the magnetically permeable component disposed on the movable portion.

FIG. 4A shows an exploded view of the movable portion 200, the coil 320, the magnetically permeable component 330, the first circuit member 800, the sensing component 1000, and the adhesive component 1510, according to some embodiments of the present disclosure. FIG. 4B shows a perspective view of the magnetically permeable component 330 disposed on the movable portion 200.

Figure 4C:
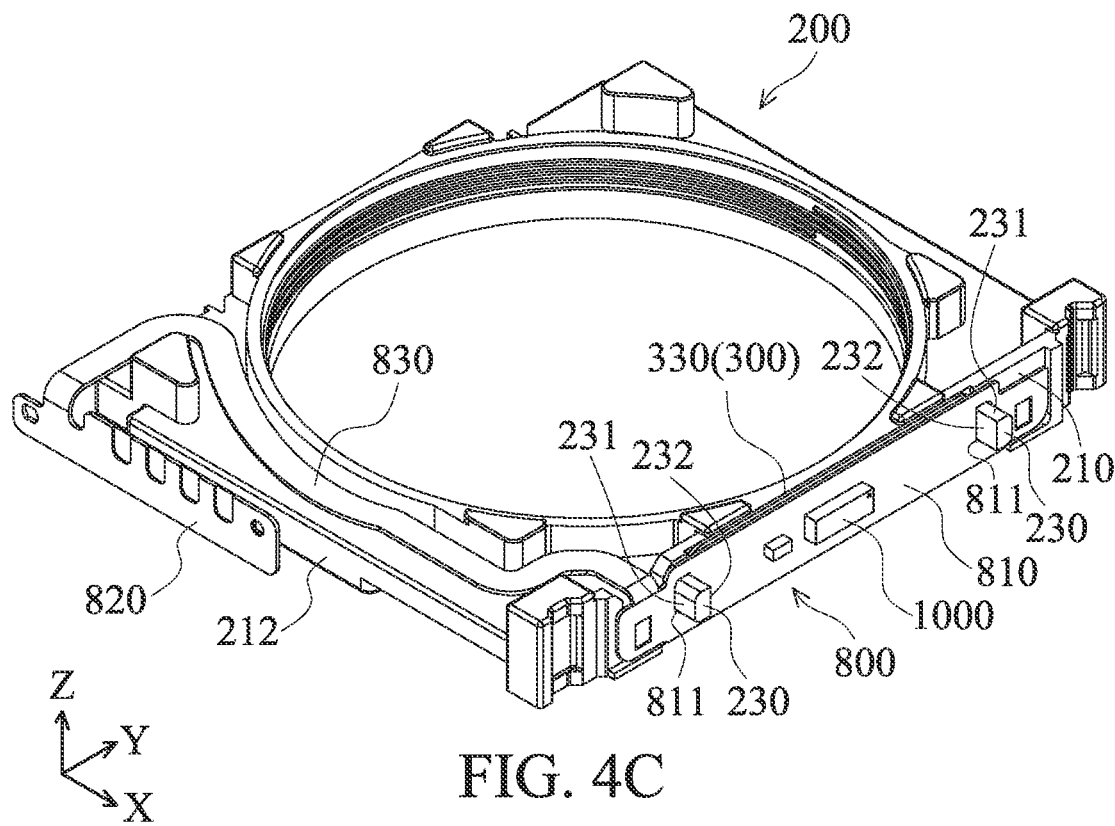
FIG. 4C shows a perspective view of the magnetically permeable component, the first circuit member, and the sensing component disposed on the movable portion.
Figure 4D:
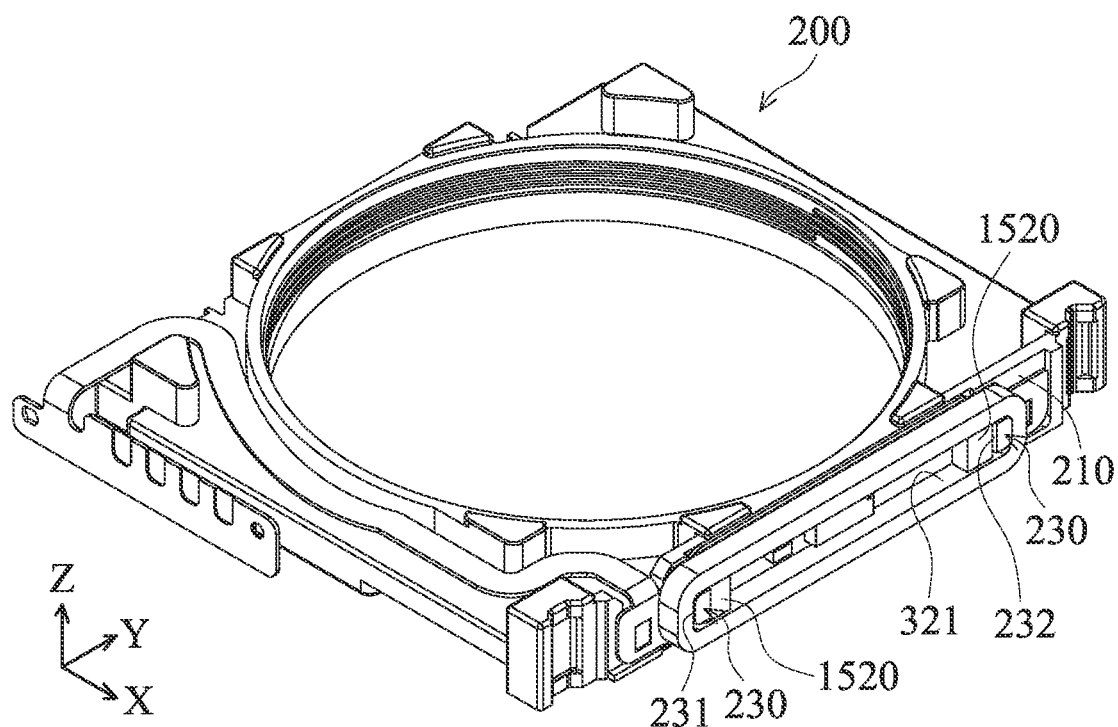
FIG. 4D shows a perspective view of the coil, the magnetically permeable component, the first circuit member, the sensing component, and the adhesive component disposed on the movable portion.
Figure 4E:
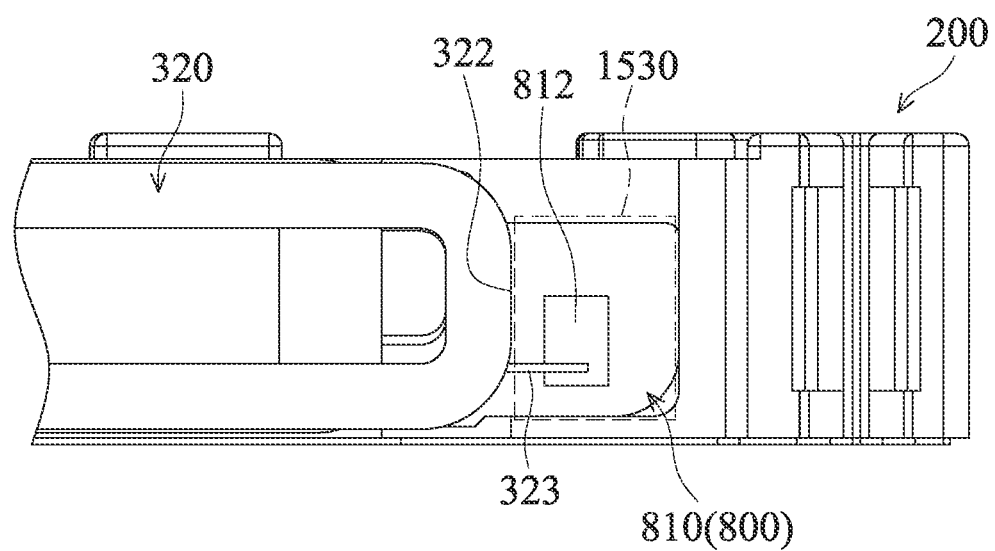
FIG. 4E is a schematic diagram showing the connection between the coil and the first circuit member.

FIG. 4C shows a perspective view of the magnetically permeable component 330, the first circuit member 800, and the sensing component 1000 disposed on the movable portion 200. FIG. 4D shows a perspective view of the coil 320, the magnetically permeable component 330, the first circuit member 800, the sensing component 1000, and the adhesive component 1520 disposed on the movable portion 200. FIG. 4E is a schematic diagram showing the connection between the coil 320 and the first circuit member 800.

As shown in FIG. 4A, the movable portion 200 includes four side portions 210, 211, 212, 213, a set of first positioning structures 220 and 225, a pair of second positioning structures 230, and a pair of contact portions 240. The side portion 210 is opposite to the side portion 211, and the side portion 210 is parallel to the side portion 211. The side portion 212 is opposite to the side portion 213, and the side portion 212 is parallel to the side portion 213.

As shown in FIG. 4A, the first positioning structures 220, 225 and the second positioning structures 230 extend from the side portion 210 of the movable portion 200 along the X-axis that is perpendicular to the optical axis O1. The first portion 810 of the first circuit member 800 is disposed between the coil 320 and the magnetically permeable component 330. The sensing component 1000 is disposed on the first portion 810 of the first circuit member 800.

As shown in FIG. 4A, the solid portion 334 of the magnetically permeable component 330 corresponds to the sensing component 1000. In other words, in the X-axis that is perpendicular to the optical axis O1, the sensing component 1000 overlaps the solid portion 334 of the magnetically permeable component 330. With this configuration, the sensing component 1000 receives the magnetic field closer to a closed state from the magnetic component 310. Thus, the variation of the sensing magnetic field is increased, thereby improving the sensing accuracy.

To further illustrate the arrangement between the movable portion 200 and the magnetically permeable component 330, please refer to FIG. 4B. As shown in FIG. 4B, the magnetically permeable component 330 is disposed on the movable portion 200 through the first positioning structures 220 and 225 and the contact portions 240.

Specifically, the first positioning structure 220 is positioned between the upper edge 331 and the extending portion 333 of the magnetically permeable component 330, so as to affix the magnetically permeable component 330 to the movable portion 200. The first positioning structure 225 is positioned between the lower edge 332 and the extending portion 333 of the magnetically permeable component 330, so as to affix the magnetically permeable component 330 to the movable portion 200.

As mentioned above, the first positioning structures 220 and 225 provide a constraint for the magnetically permeable component 330 in the Z-axis. In addition, the two contact portions 240 of the movable portion 200 contact the left and right ends of the magnetically permeable component 330 to provide a constraint for the magnetically permeable component 330 in the Y-axis.

Although not shown, it should be understood that an adhesive component may be provided in the gap between the first positioning structure 220 and the solid portion 334 to further affix the magnetically permeable component 330 to the movable portion 200.

Please refer back to FIG. 4A. As shown in FIG. 4A, the adhesive component 1510 is disposed between the magnetically permeable component 330 and the first portion 810 of the first circuit member 800 to affix the first portion 810 of the first circuit member 800 to the magnetically permeable component 330.

It should be understood that, although in this embodiment, the first circuit member 800 is affixed to the magnetically permeable component 330 via the adhesive component 1510. However, the present disclosure does not limit the connection between the magnetically permeable component 330 and the first circuit member 800. Specifically, in some embodiments, the first circuit member 800 may be affixed to the magnetically permeable component 330 by soldering.

As shown in FIG. 4A, the coil 320 includes an inner side 321, an outer side 322, and a first connecting portion 323. The coil 320 is affixed to the side portion 210 of the movable portion 200 via the second positioning structure 230. The connection arrangement between the inner side 321 and the outer side 322 of the coil 320 and the second positioning structure 230, and the connection arrangement between and the first connecting portion 323 of the coil 320 and the first circuit member 800 are described in detail later.

It can also be seen in FIG. 4A that the first portion 810 of the first circuit member 800 includes a pair of openings 811 and a second connecting portion 812. The connection arrangement between the first connecting portion 323 of the coil 320 and the second connecting portion 812 of the first circuit member 800 is described in detail with respect to FIG. 4E.

Figure 7:
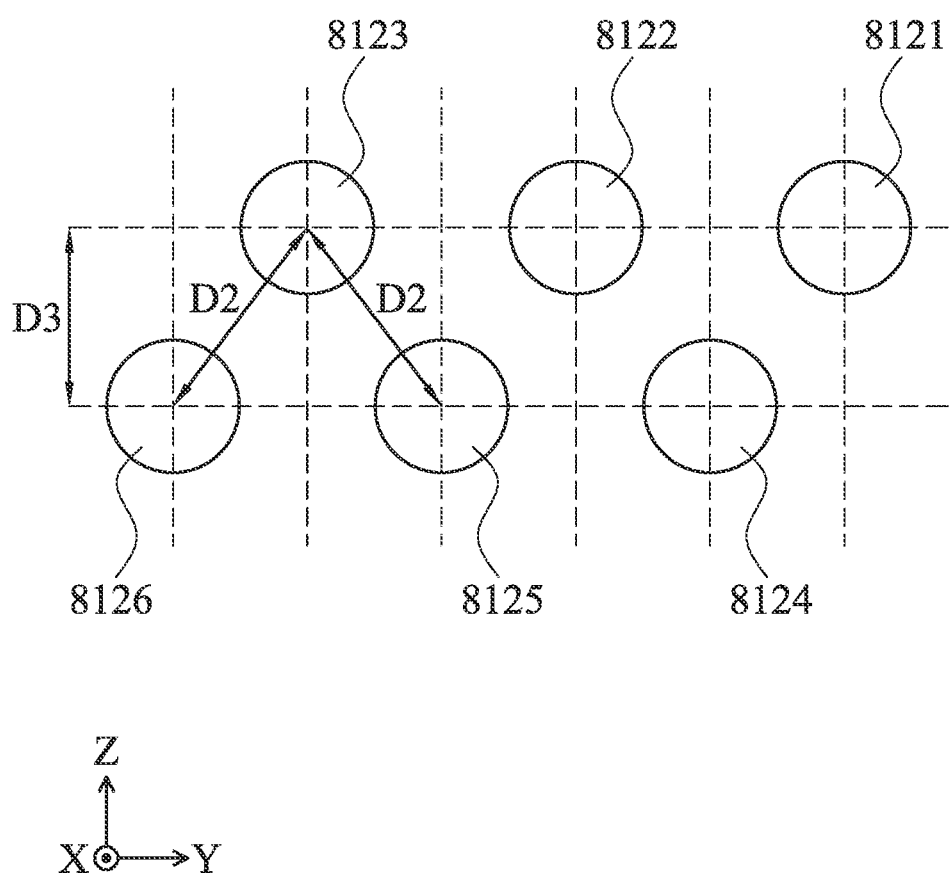
FIG. 7 shows a schematic diagram of first electrical connecting points and second electrical connecting points of a second connecting portion.

Although not shown in FIG. 4A, the second connecting portion 812 includes three first electrical connecting points 8121, 8122, 8123 and three second electrical connecting points 8124, 8125, 8126, the details of which are described in detail with respect to FIG. 7.

To further illustrate the arrangement between the movable portion 200 and the first circuit member 800, please refer to FIG. 4A and FIG. 4C together. As shown in FIG. 4C, the second positioning structures 230 of the movable portion 200 pass through the openings 811 of the first portion 810 to position the first portion 810 of the first circuit member 800 on the movable portion 200.

In some embodiments, an adhesive component (not shown) may be disposed between the first positioning structure 220 (FIG. 4B) and the first portion 810 of the first circuit member 800, to affix the first portion 810 of the first circuit member 800 to the movable portion 200.

In addition, as shown in FIG. 4C, the two second positioning structures 230 each include an outer side 231 and an inner side 232. The outer side 231 generally has a curved surface. The inner side 232 generally has a flat surface, and the two inner sides 232 face each other. The fixed arrangement between the outer side 231 and the inner side 232 of the second positioning structure 230 and the coil 320 are described in detail later.

It can also be seen in FIG. 4C that the first portion 810 of the first circuit member 800 is located on the side portion 210 of the movable portion 200. The second portion 820 is located on the other adjacent side portion 212 of the movable portion 200. The third portion 830 is wound around the upper surface of the movable portion 200 facing the top cover 110 (FIG. 2).

It should be understood that when the movable portion 200 moves in the optical axis O1 (Z-axis) through the first driving assembly 300, the flexible third portion 830 is movably connected to the movable portion 200 and the base 120 (FIG. 2) through the first portion 810 and the second portion 820.

To further illustrate the arrangement between the movable portion 200 and the coil 320, please refer to FIG. 4D. As shown in FIG. 4D, the coil 320 is positioned on the side portion 210 of the movable portion 200 via the second positioning structures 230.

Specifically, the second positioning structures 230 are a pair of protruding structures, and the coil 320 is positioned on the movable portion 200 by disposed both ends of the inner side 321 of the annular coil 320 to the outer side 231 of the second positioning structures 230.

As shown in FIG. 4D, the adhesive components 1520 are disposed on the inner sides 232 of the second positioning structures 230 and the inner sides 321 of the coil 320, to further secure the coil 320 to the second positioning structures 230.

Referring to FIG. 4E, the first connecting portion 323 of the coil 320 is electrically connected to the second connecting portion 812 on the first portion 810 of the first circuit member 800 by soldering. After the first connecting portion 323 is soldered to the second connecting portion 812, the adhesive component 1530 (shown in dash line) is disposed on the first connecting portion 323 and the second connecting portion 812.

The adhesive component 1530 also contacts the outer side 322 of the coil 320 as shown in FIG. 4E. Therefore, the adhesive component 1530 may not only avoid dust problems (for example, dust caused by falling solder for soldering the first connecting portion 323 and the second connecting portion 812), but also may strengthen the connection between the coil 320 and the first circuit member 800.

Figure 5:
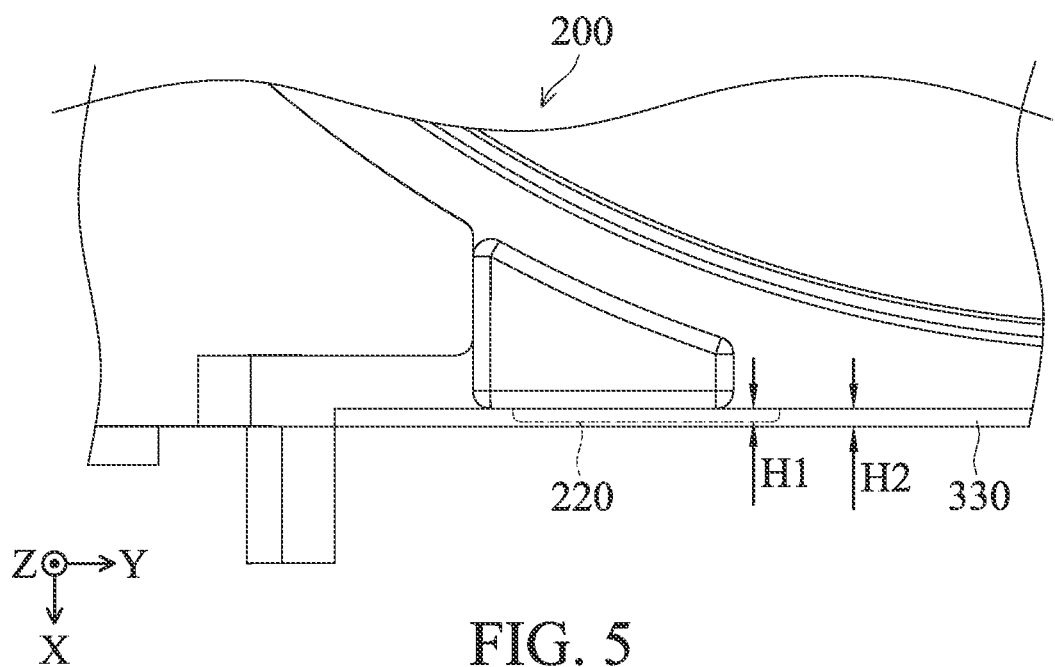
FIG. 5 shows a partial top view of FIG. 4B.

FIG. 5 shows a partial top view of FIG. 4B. As shown in FIG. 5, in the X-axis, the height H1 of the first positioning structure 220 is lower than the height H2 of the magnetically permeable component 330. In other words, when viewed along the Z-axis, the first positioning structures 220 do not protrude beyond the magnetically permeable component 330.

Figure 6:
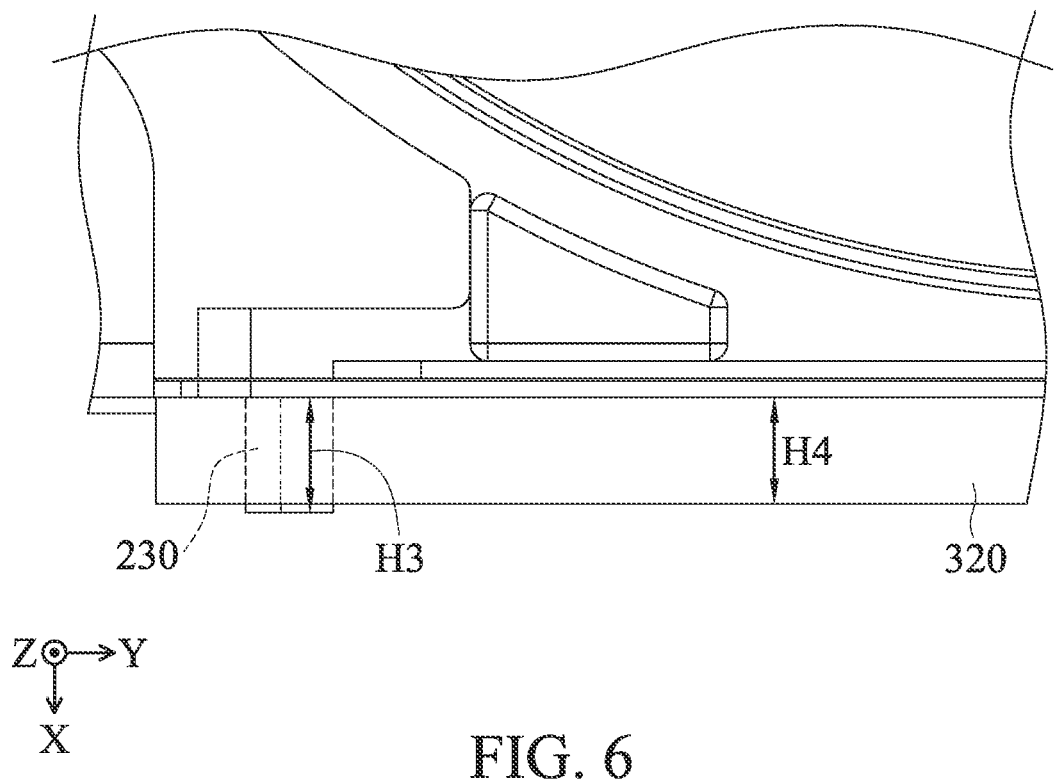
FIG. 6 shows a partial top view of FIG. 4D.

FIG. 6 shows a partial top view of FIG. 4D. As shown in FIG. 6, in the X-axis, the height H3 of the second positioning structure 230 is higher than the height H4 of the coil 320. In other words, when viewed along the Z-axis, the second positioning structures 230 protrude beyond the coil 320.

FIG. 7 shows a schematic diagram of the first electrical connecting points 8121, 8122, 8123 and the second electrical connecting points 8124, 8125, and 8126 of the second connecting portion 812. The first electrical connecting points 8121, 8122, 8123 and the second electrical connecting points 8124, 8125, 8126 are arranged along the Y-axis.

In some embodiments, the first electrical connecting point 8121 and the second electrical connecting point 8124 may be the electrical connecting points that are electrically connected to the coil 320 (FIG. 4E). The first electrical connecting points 8122 and 8123 and the second electrical connecting points 8125 and 8126 may be the electrical connecting points that are electrically connected to the first circuit member 800.

When viewed along the Z-axis, the first electrical connecting points 8121, 8122, 8123 do not aligned with the second electrical connecting points 8124, 8125, 8126. When viewed along the Z-axis, the first electrical connecting point 8122 is located between the second electrical connecting points 8124 and 8125. When viewed along the Z-axis, the first electrical connecting point 8123 is located between the second electrical connecting points 8125 and 8126. The height of the first electrical connecting points 8121, 8122, 8123 positioned in the Z-axis is greater than the height of the second electrical connecting points 8124, 8125, 8126 positioned in the Z-axis.

Since each of the first electrical connecting points 8121, 8122, 8123 and the second electrical connecting points 8124, 8125, and 8126 needs to be separated by at least a distance D2. Therefore, in this embodiment, with the configuration of the first electrical connecting points 8121, 8122, 8123 not aligned with the second electrical connecting points 8124, 8125, 8126, the distance D3 between the first electrical connecting points 8121, 8122, 8123 and the second electrical connecting points 8124, 8125, 8126 in the Z-axis may be shortened. This configuration may achieve the effect of thinning the optical component driving mechanism 10 of the present disclosure.

Figure 8A:
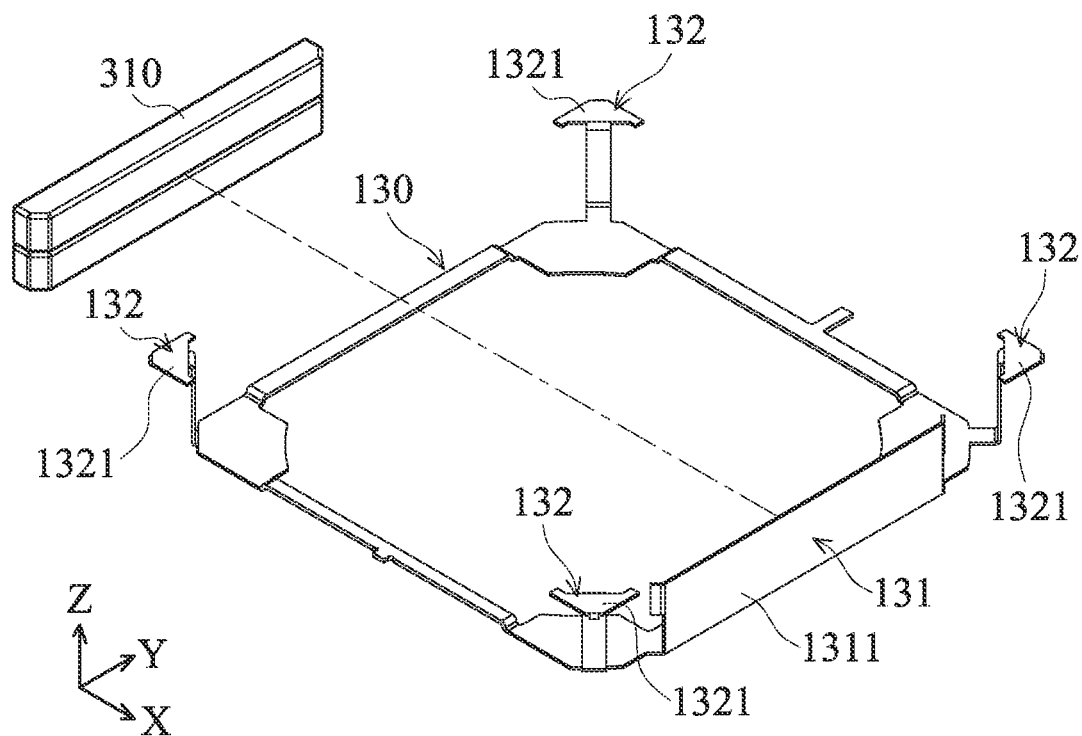
FIG. 8A shows a perspective view of a bracket member and a magnetic component, according to some embodiments of the present disclosure.

FIG. 8A shows a perspective view of the bracket member 130 and the magnetic component 310, according to some embodiments of the present disclosure. As shown in FIG. 8A, the bracket member 130 includes a retaining wall 131 and four top plates 132. The retaining wall 131 includes a first surface 1311. Each top plate 132 includes a second surface 1321. The first surface 1311 is perpendicular to the second surface 1321. As shown in FIG. 8A, the magnetic component 310 is disposed on the retaining wall 131.

Figure 8B:
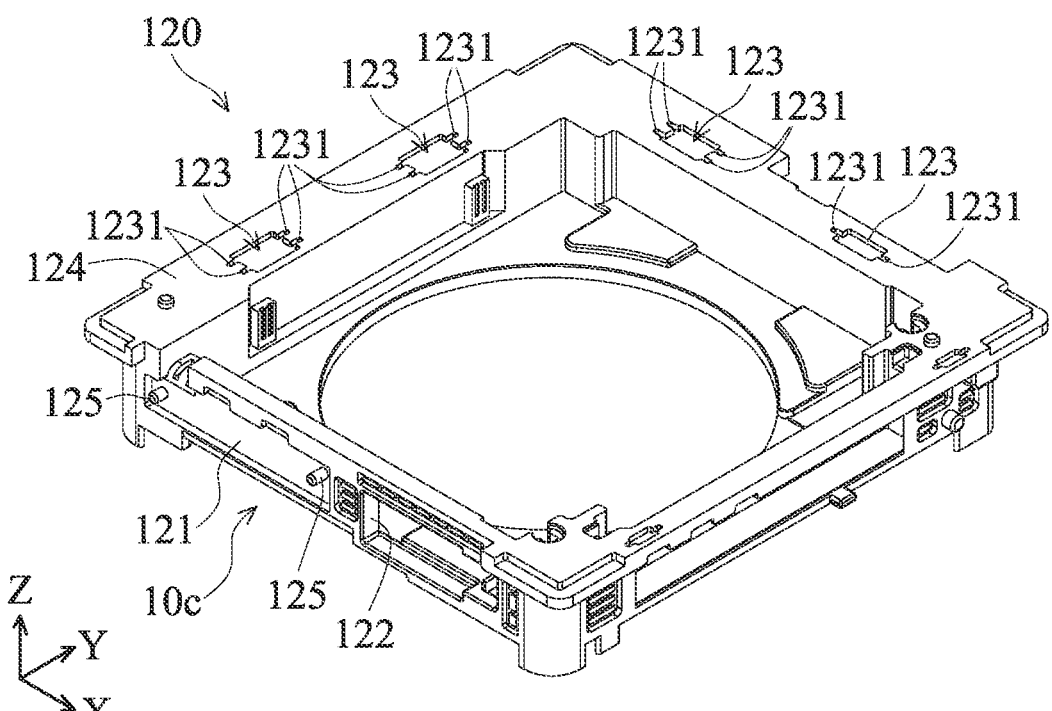
FIG. 8B shows a perspective view of a base, according to some embodiments of the present disclosure.

FIG. 8B shows a perspective view of the base 120, according to some embodiments of the present disclosure. The base 120 includes an accommodating portion 121, an opening 122, a set of glue filling grooves 123, a top surface 124, and a set of protruding portions 125.

The accommodating portion 121 and the opening 122 are located at the third side 10c of the optical component driving mechanism 10. The accommodating portion 121 is configured to accommodate the second reinforcing component 1400 (FIG. 2), the details of which are shown in FIG. 11. The opening 122 is configured to accommodate the control integrated circuit 1200 (FIG. 2) disposed on the second circuit member 900 (FIG. 2), the details of which are shown in FIG. 11.

A set of glue filling grooves 123 are located on the top surface 124 of the base 120. Adhesive components (not shown) may be disposed in the glue filling grooves 123 to affix the base 120 to the top cover 110 (FIG. 2). Each glue filling groove 123 includes a set of extending portions 1231. This configuration may increase the bonding area between the top cover 110 and the base 120, thereby enhancing the adhesion effect. The protruding portions 125 are located in the accommodating portion 121 for fixing the components disposed in the accommodating portion 121, the details of which are described in detail with respect to FIG. 11.

Figure 8C:
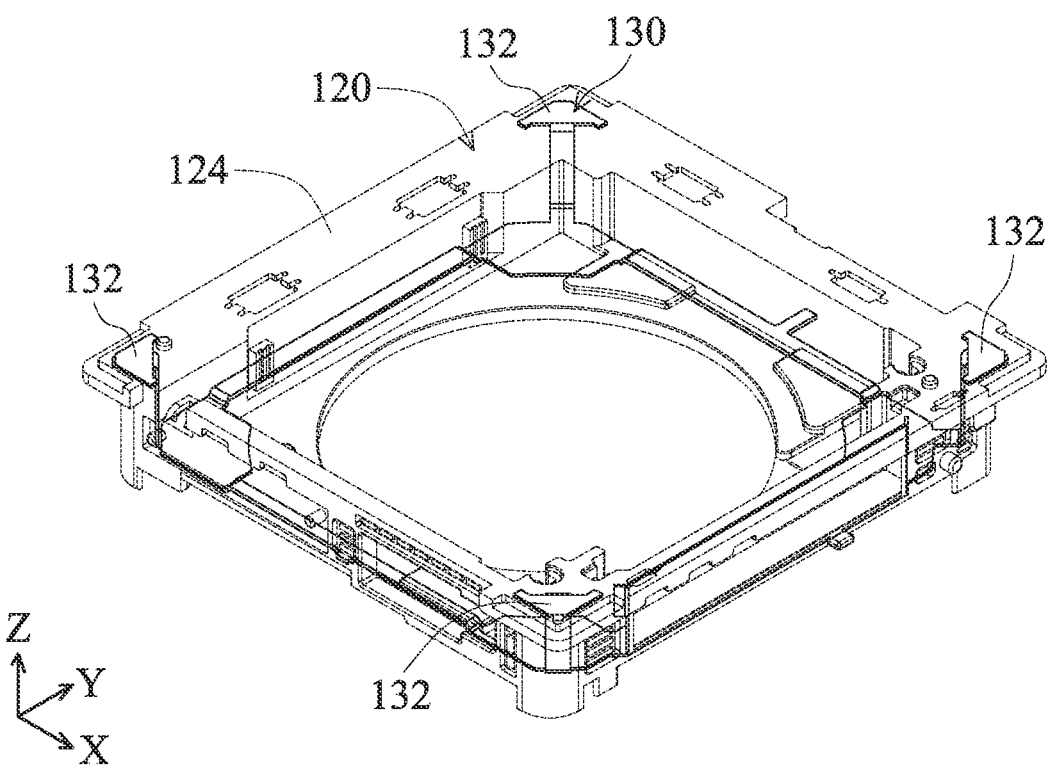
FIG. 8C shows the base and the bracket member, according to some embodiments of the present disclosure, wherein the base is shown in dash line for illustration purposes.

FIG. 8C shows the base 120 and the bracket member 130, according to some embodiments of the present disclosure. The base 120 is shown in dash line for illustration purposes. The bracket member 130 partially embedded in the base 120 can be seen in FIG. 8C. It can also be seen in FIG. 8C that the top surface 124 of the base 120 exposes the top plate 132 of the bracket member 130.

Figure 9:
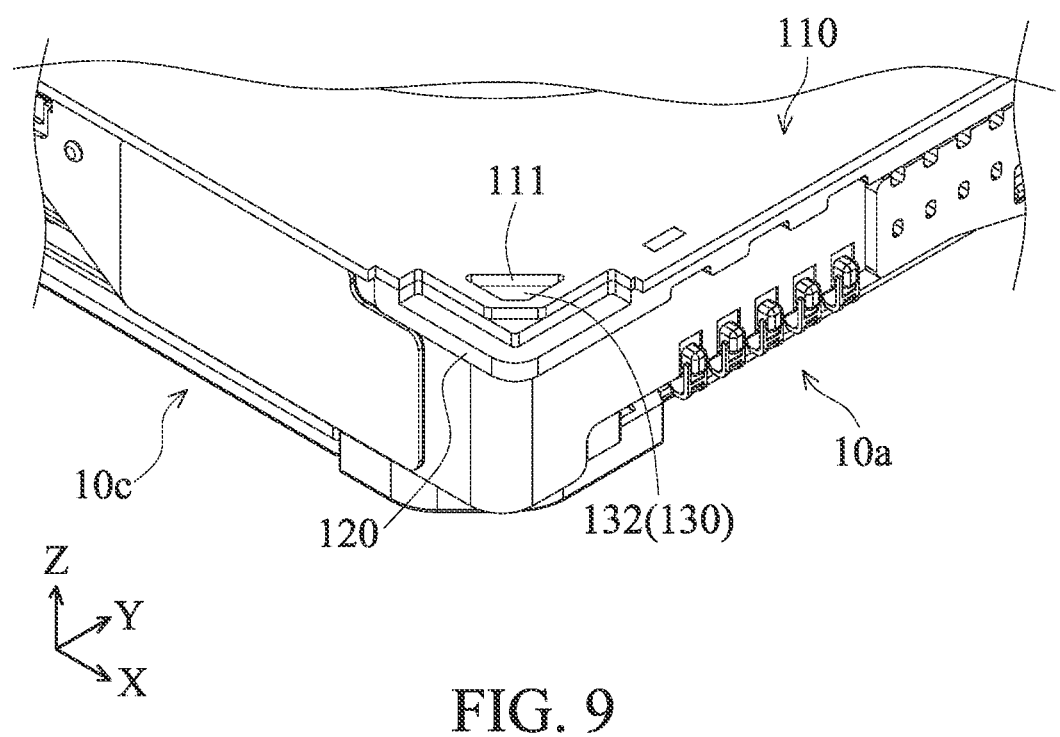
FIG. 9 shows an enlarged view of a junction of a first side and a third side of the optical component driving mechanism, according to some embodiments of the present disclosure.

FIG. 9 shows an enlarged view of the junction of the first side 10*a* and the third side 10*c* of the optical component driving mechanism 10, according to some embodiments of the present disclosure. The top cover 110 includes four filling portions 111 located at the four corners, and only the filling portions 111 located at the junction of the first side 10*a* and the third side 10*c* are shown in FIG. 9 for illustration purposes. The top cover 110 may be affixed to the base 120 by soldering the filling portion 111 and the top plate 132 of the bracket member 130 together.

Figure 10B:
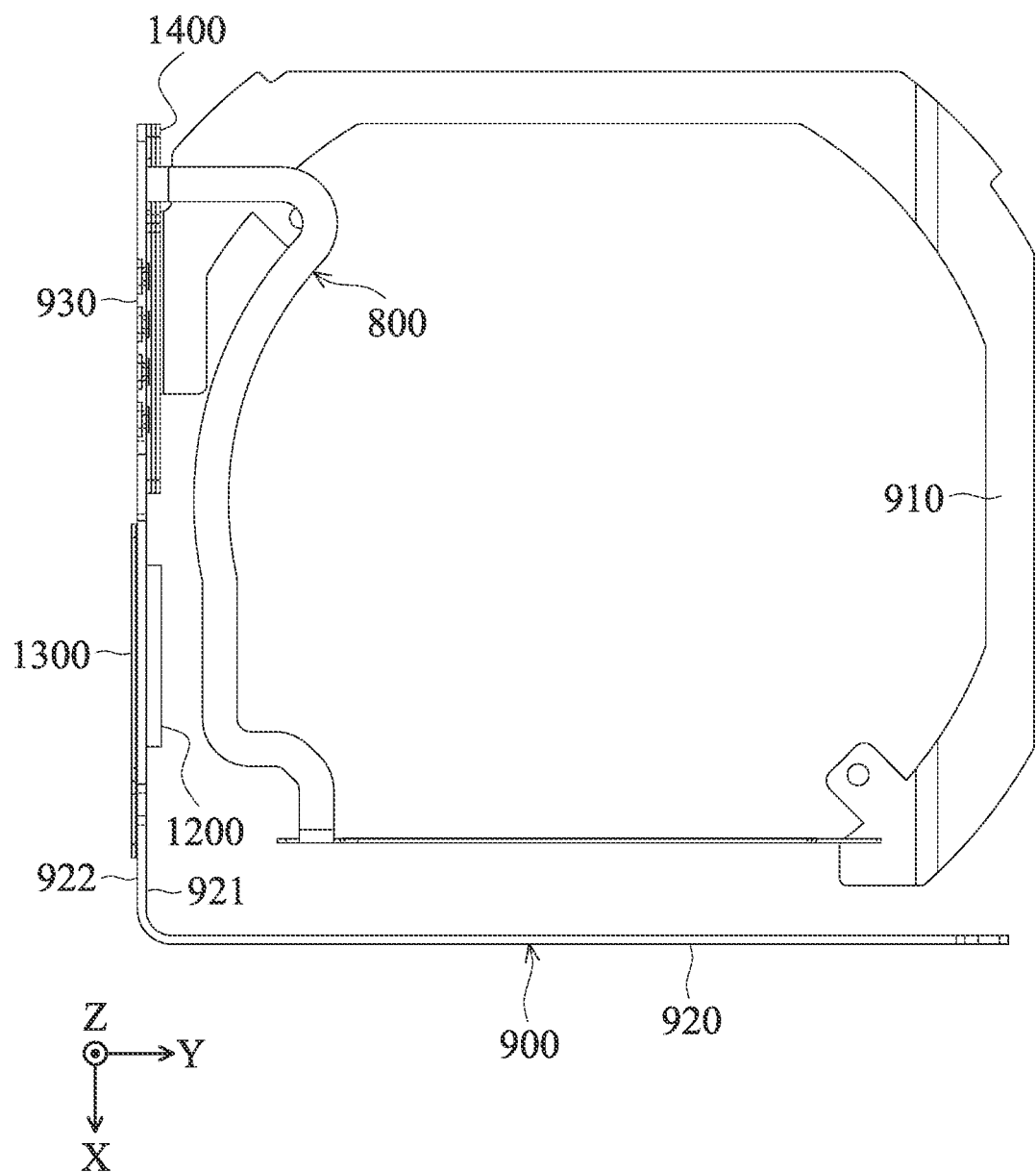
FIG. 10B shows a top view of the first circuit member, the second circuit member, the control integrated circuit, the first reinforcing component, and the second reinforcing component, according to some embodiments of the present disclosure.

FIG. 10A shows an exploded view of the first circuit member 800, the second circuit member 900, the control integrated circuit 1200, the first reinforcing component 1300, the second reinforcing component 1400, and the adhesive component 1540, according to some embodiments of the present disclosure. FIG. 10B shows a top view of the first circuit member 800, the second circuit member 900, the control integrated circuit 1200, the first reinforcing component 1300, and the second reinforcing component 1400, according to some embodiments of the present disclosure.

Please refer to FIGS. 10A to 10B together, the second circuit member 900 includes a fixing plate 910, a vertical portion 920, and a first electrical connection portion 930. The second portion 820 of the first circuit member 800 includes a second electrical connection portion 821 and a set of holes 822. The second reinforcing component 1400 includes a set of holes 1410.

The fixing plate 910 is disposed on the base plate 140 (FIG. 2). The extending direction of the fixing plate 910 is perpendicular to the Z-axis, that is, the fixing plate 910 is substantially parallel to the XY-plane. The extending direction of the vertical portion 920 is parallel to the Z-axis. The extending direction of the fixing plate 910 is perpendicular to the extending direction of the vertical portion 920.

According to some embodiments of the present disclosure, the vertical portion 920 includes an inner surface 921, an outer surface 922, and a set of holes 923. The second portion 820 of the first circuit member 800 is disposed between the inner surface 921 of the vertical portion 920 and the second reinforcing component 1400. The control integrated circuit 1200 is disposed on the inner surface 921 of the vertical portion 920. The first reinforcing component 1300 is disposed on the outer surface 922 of the vertical portion 920. The second reinforcing component 1400 is disposed on the inner surface 921 of the vertical portion 920. The holes 822 are generally aligned with the holes 923 and the holes 1410. The protruding portions 125 of the base 120 (FIG. 8B) pass through the holes 822, 923, and 1410, the details of which are shown with respect to FIG. 11.

According to some embodiments of the present disclosure, the first electrical connection portion 930 is electrically connected to the second electrical connection portion 821. More specifically, the first electrical connection portion 930 is connected to the second electrical connection portion 821 by soldering. The second electrical connection portion 821 is disposed between the second reinforcing component 1400 and the first electrical connection portion 930. In this way, the second reinforcing component 1400 may protect the soldering points of the first electrical connection portion 930 and the second electrical connection portion 821.

According to some embodiments of the present disclosure, the second circuit member 900 further includes a third electrical connection portion 940. The control integrated circuit 1200 is electrically connected to the second circuit member 900 through the third electrical connection portion 940. The first reinforcing member 1300 is affixed to the outer surface 922 of the vertical portion 920 by the adhesive component 1540.

As shown in FIG. 10B, the first reinforcing component 1300 and the second reinforcing component 1400 do not overlap in Y-axis. In addition, the control integrated circuit 1200, the first reinforcing component 1300, and the second reinforcing component 1400 are located on the same side of the optical component driving mechanism 10.

FIG. 11 shows an exploded view of the third side 10*c* of the optical component driving mechanism 10, according to some embodiments of the present disclosure. As shown in FIG. 11, the control integrated circuit 1200 disposed on the second circuit member 900 is accommodated in the opening 122 of the base 120. The second reinforcing component 1400 is disposed in the accommodating portion 121 of the base 120. The holes 822, 923, 1410 accommodate the protruding portions 125 of the base 120. The protruding portions 125 pass through the holes 1410, 822 and 923 in sequence to fix the positions of the second circuit member 900, the second portion 820 of the first circuit member 800, and the second reinforcing component 1400 relative to the base 120.

Figure 12A:
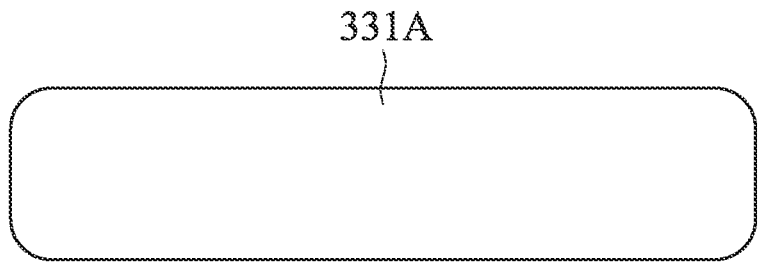
FIG. 12A is a front view of a magnetically permeable component, according to another embodiment of the present disclosure.

FIG. 12A shows a front view of a magnetically permeable component 330A, according to another embodiment of the present disclosure. As shown in FIG. 12A, the magnetically permeable component 330A only includes a solid portion 331A. With this configuration, the restoring force will be greater as the movable portion (not shown) gets closer to the limit position of the movable portion. This restoring force, which increases gradually during the driving process, will affect the driving function of the movable portion.

Figure 12B:
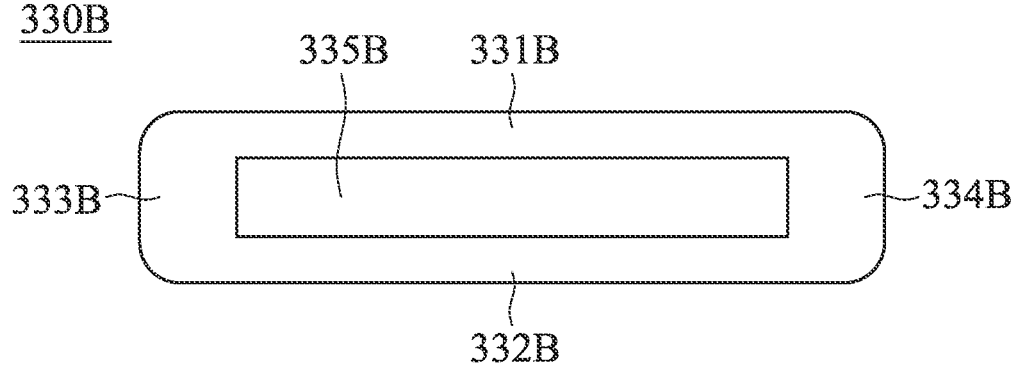
FIG. 12B is a front view of the magnetically permeable component, according to another embodiment of the present disclosure.

FIG. 12B shows a front view of a magnetically permeable component 330B, according to another embodiment of the present disclosure. As shown in FIG. 12B, the magnetically permeable component 330B includes an upper edge 331B, a lower edge 332B, a left edge 333B, a right edge 334B, and an opening 335B. The opening 335B is surrounded by upper edge 331B, lower edge 332B, left edge 333B, and right edge 334B.

Since the magnetically permeable component 330B has the configuration of the opening 335B, when the movable portion (not shown) moves within a driving range, the restoring force may be maintained within a certain value. Thus, the driving assembly may have better performance (such as, better driving accuracy).

Figure 12C:
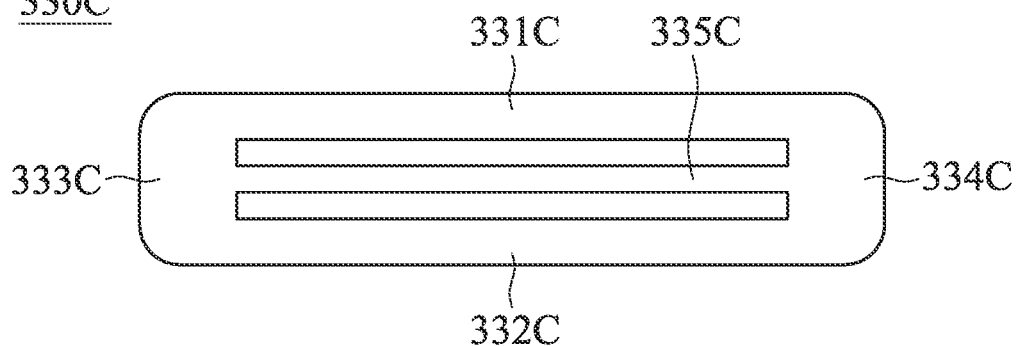
FIG. 12C is a front view of the magnetically permeable component, according to another embodiment of the present disclosure.

FIG. 12C shows a front view of a magnetically permeable component 330C, according to another embodiment of the present disclosure. As shown in FIG. 12C, the magnetically permeable component 330C includes an upper edge 331C, a lower edge 332C, a left edge 333C, a right edge 334C, and an extending portion 335C. The extending portion 335C is parallel to the upper edge 331C and the lower edge 332C. The extension 335C extends between the left edge 333C and the right edge 334C.

With the configuration of the magnetically permeable component 330C, when the movable portion (not shown) moves within a driving range, the restoring force may be maintained within a certain value. Thus, the driving assembly may have better performance (such as, better driving accuracy).

To sum up, with the configuration of the magnetically permeable component of the present invention, the restoring force generated between the magnetic component and the magnetically permeable component may be maintained within a certain value. Thus, the driving assembly has better performance. The sensing component of the present invention corresponds to the solid portion of the magnetically permeable component. Therefore, the sensing component receives the magnetic field closer to a closed state from the magnetic component. Thus, the variation of the sensing magnetic field is increased, thereby improving the sensing accuracy.

The ordinal numbers in this specification and the claim, such as "first", "second", etc., do not have a sequential relationship between each other, and they are only used to distinguish two different components with the same name.

Although embodiments of the present disclosure and their advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope of such processes, machines, manufacture, and compositions of matter, means, methods, or steps. In addition, each claim constitutes a separate embodiment, and the combination of various claims and embodiments are within the scope of the disclosure.

It will be apparent to those skilled in the art that various modifications and variations can be made in the invention. It is intended that the standard and examples be considered as exemplary only, with the true scope of the disclosed embodiments being indicated by the following claims and their equivalents.

What is claimed is:

1. An optical component driving mechanism, comprising:
   a movable portion connected to an optical component, comprising a side portion, wherein the optical component has an optical axis;
   a fixed portion, wherein the movable portion is movable relative to the fixed portion;
   a driving assembly, comprising a coil and a magnetically permeable component, for driving the movable portion to move relative to the fixed portion; and
   a first circuit member, for transmitting electrical signals, comprising a first portion, wherein the first portion is disposed between the coil and the magnetically permeable component;
   wherein the coil, the magnetically permeable component, and the first portion of the first circuit member are disposed on the side portion of the movable portion;
   wherein the magnetically permeable component comprises an upper edge, a lower edge, and an extending portion, wherein the extending portion is parallel to the upper edge and the lower edge, and the extending portion is positioned between the upper edge and the lower edge;
   wherein the extending portion of the magnetically permeable component is spaced from the upper edge by a distance, and the extending portion of the magnetically permeable component is spaced from the lower edge by the distance.

2. The optical component driving mechanism as claimed in claim 1, wherein the magnetically permeable component comprises a left edge, a right edge, and an opening, wherein the upper edge, the lower edge, the left edge, and the right edge surround the opening.

3. The optical component driving mechanism as claimed in claim 1, wherein the magnetically permeable component further comprises a solid portion positioned between the upper edge and the lower edge, and connected with the upper edge and the lower edge, wherein the extending portion extends from the solid portion.

4. The optical component driving mechanism as claimed in claim 3, further comprising a sensing component, disposed on the first portion of the first circuit member, and overlapping the solid portion of the magnetically permeable component in a direction that is perpendicular to the optical axis.

5. The optical component driving mechanism as claimed in claim 1, wherein the movable portion comprises a first positioning structure extending from the side portion of the movable portion in a direction that is perpendicular to the optical axis, and the first positioning structure is positioned between the upper edge and the extending portion of the magnetically permeable component, to position the magnetically permeable component on the movable portion.

6. The optical component driving mechanism as claimed in claim 5, wherein the movable portion further comprises another first positioning structure extending from the side portion of the movable portion along the direction that is perpendicular to the optical axis, and the another first positioning structure is positioned between the lower edge and the extending portion of the magnetically permeable component, to position the magnetically permeable component on the movable portion.

7. The optical component driving mechanism as claimed in claim 5, wherein in the direction that is perpendicular to the optical axis, a height of the first positioning structure is lower than a height of the magnetically permeable component.

8. The optical component driving mechanism as claimed in claim 5, wherein the movable portion further comprises a second positioning structure extending from the side portion of the movable portion in a direction that is perpendicular to the optical axis.

9. The optical component driving mechanism as claimed in claim 8, wherein the first portion of the first circuit member comprises an opening, wherein the second positioning structure passes through the opening to position the first portion of the first circuit member on the movable portion.

10. The optical component driving mechanism as claimed in claim 9, wherein the coil is affixed to the side portion of the movable portion via the second positioning structure.

11. The optical component driving mechanism as claimed in claim 10, wherein in the direction that is perpendicular to the optical axis, a height of the second positioning structure is higher than a height of the coil.

12. The optical component driving mechanism as claimed in claim 1, wherein the coil comprises a first connecting portion, and the first circuit member comprises a second connecting portion, wherein the first connecting portion is electrically connected to the second connecting portion via soldering.

13. The optical component driving mechanism as claimed in claim 12, wherein the second connecting portion comprises a plurality of first electrical connecting points and a plurality of second electrical connecting points, the first electrical connecting points and the second electrical connecting points are disposed in a direction that is perpendicular to the optical axis, wherein the plurality of first electrical connecting points are each located between the plurality of second electrical connecting points when viewed along the optical axis, wherein a height of the plurality of first electrical connecting points on the optical axis is greater than a height of the plurality of second electrical connecting points on the optical axis.

14. The optical component driving mechanism as claimed in claim 12, further comprising an adhesive component disposed on the first connecting portion and the second connecting portion after the first connecting portion is soldered to the second connecting portion.

15. The optical component driving mechanism as claimed in claim 14, wherein the coil comprises an inner side and an outer side, wherein the adhesive component contacts the outer side of the coil.

16. The optical component driving mechanism as claimed in claim 15, further comprising another adhesive component disposed on the inner side of the coil.

17. The optical component driving mechanism as claimed in claim 1, wherein the first circuit member further comprises a second portion and a third portion, wherein the second portion is disposed on the fixed portion, and the first portion is connected to the second portion through the third portion.

18. The optical component driving mechanism as claimed in claim 17, further comprising a second circuit member disposed on the fixed portion and electrically connected to the second portion of the first circuit member.

* * * * *